United States Patent [19]
Langeron

[11] 3,774,044
[45] Nov. 20, 1973

[54] METHOD OF DETECTION IN AN ALARM SYSTEM

[76] Inventor: Roger Jules Langeron, 12, Avenue de Bretteville, Neuilly-sur-Seine, France

[22] Filed: Feb. 3, 1972

[21] Appl. No.: 223,073

[52] U.S. Cl. ............... 250/389, 340/227 S, 73/358
[51] Int. Cl. ............................................. G01t 1/18
[58] Field of Search.............. 73/358; 116/114.5; 340/228 S, 227 S; 250/83.6

[56] References Cited
UNITED STATES PATENTS

| | | | |
|---|---|---|---|
| 1,774,961 | 9/1930 | Buchholz | 340/228 S |
| 2,759,174 | 8/1956 | Brailsford | 340/228 S |
| 1,998,943 | 4/1935 | Sabbah | 328/3 |
| 2,932,971 | 4/1960 | Moore et al. | 340/227 |
| 2,331,025 | 10/1943 | Grooms | 328/3 |
| 3,329,022 | 7/1967 | Feldman | 73/358 |
| 3,520,274 | 7/1970 | Schreier et al. | 116/114.5 |

Primary Examiner—Harold A. Dixon
Attorney—William Kaufman et al.

[57] ABSTRACT

An improved ionization detection method and apparatus is described wherein a material which is adapted to emit a vapor, aerosol or fumes at a predetermined elevated temperature is deposited on a body whose temperature is to be monitored. Means including an ionization detector are provided for sensing the emission and for indicating the existence of the predetermined body temperature.

3 Claims, 8 Drawing Figures

PATENTED NOV 20 1973　　　　　　　　　　　　　　　3,774,044

METHOD OF DETECTION IN AN ALARM SYSTEM

This invention relates to an improved method and apparatus for detecting a fault condition in an apparatus or for detecting prdetermined environmental conditions.

The invention relates more particularly to an improved method and apparatus for employing an ionization detector for sensing predetermined conditions.

It is often desirable to provide means for automatically monitoring the operating conditions of apparatus such as machinery or complex electronic apparatus. A fault condition in the machinery or electronic apparatus can result in the generation of a relatively large amount of heat and cause self destruction of the equipment. Further, it is also desirable to monitor the atmospheric environment of such areas such as storage depots, factories and the like in order to sense abnormal environmental conditions. For example, it is desirable at times to monitor environmental conditions for detecting the escape of gases or fumes from storage containers or for sensing smoke as an early fire warning.

The ionization detector has proven itself to be a useful tool in sensing fumes, gases and/or aerosols which result from the existence of the abnormal condition. However, the use of ionization detectors has heretofore required the generation of a vapor which could be detected and this vapor was provided by an overheated element or by fire resulting in smoke. Consequently, at least some preliminary damage and destruction was perfected by the fault condition or abnormal environment until such vapors were generated and sensed by the detector. It would, of course, be desirable to provide a detection system which sensed the abnormal conditions or environment with an ionization detector while at the same time eliminated the damage or partial destruction to apparatus or the environment which is to be protected.

Accordingly, it is an object of this invention to provide an improved method and apparatus for ionization detection.

Another object of the invention is to provide an improved method and apparatus for ionization detection which avoids damage or destruction preliminary to the generation of vapors which can be sensed.

Another object of the invention is to provide an improved method and apparatus for sensing and indicating an abnormal condition in a machine or other apparatus.

A further object of the invention is to provide an improved method and apparatus for sensing abnormal environmental conditions.

In accordance with the general features of the method and apparatus of this invention, a material is deposited on a body which is to be monitored or is located in an atmosphere which is to be monitored. The material comprises a vaporizable material which will vaporize at a temperature above normal operating temperature for the apparatus or environment and below that temperature at which partial destruction will occur to the apparatus or in the environment as a result of heat. Thus a vapor is created which can be sensed by an ionization detector prior to the occurence of heat damage. The body upon which the vaporizable material is deposited comprises a machine or apparatus component which is being monitored or alternatively the body comprises an independent support body provided for supporting the vaporizable material within the environment being monitored. In accordance with other features of the invention, vaporizable materials having different temperatures of vaporization are employed and are deposited on different bodies in order to effect ionization detection which discriminates between apparatus or environments which are experiencing abnormal conditions.

These and other objects and features of the invention will become apparent with reference to the following specification and to the drawings wherein.

Figure 1A:
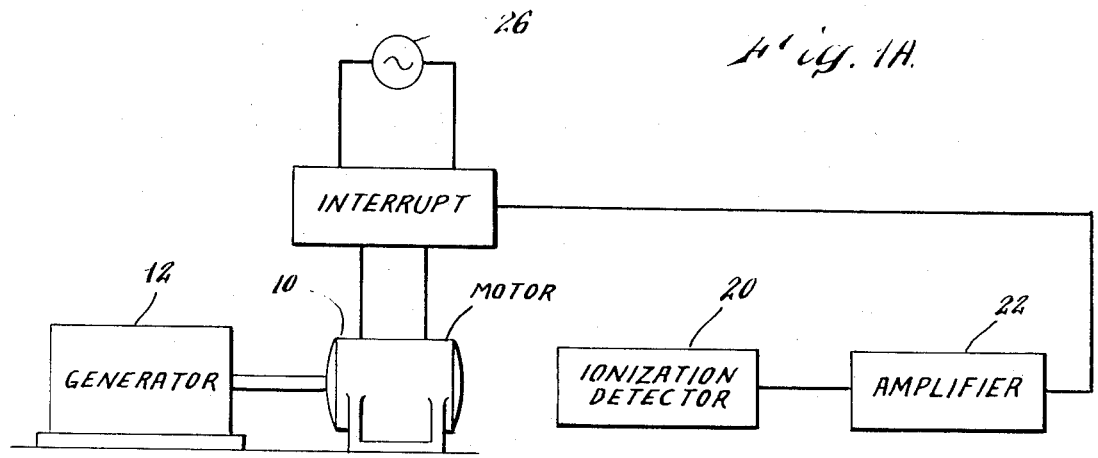
FIG. 1A is a schematic diagram in block form of an apparatus utilizing an ionization detection system in accordance with the present invention.

Referring now to the drawings, and more particularly to FIG. 1A, there is shown a motor generator combination comprising a motor 10 which is mechanically coupled to a generator 12. As is well known, a motor is often subject to overheating and self-destruction. In accordance with the invention, a film or layer 14 of a vaporizable material which can be detected by an ionization detector is deposited upon a paint film 16 which is formed on a motor cover 18. During operation, the motor will have an elevated operating temperature with respect to its off-duty temperature. This operating temperature $T_1$ comprises its design safe operating temperature. The material 14 is selected to at least partially vaporize at a temperature $T_2$ which is intermediate the safe operating temperature $T_1$ and a higher temperature $T_3$ which if attained during operation will result in serious damage and possible destruction of the motor 10. The attainment of a temperature $T_2$ by the motor 10 represents the existence of a faulty condition in a motor and the vaporization of the material 14 at this temperature results in an automatically detectable indication which can be utilized to interrupt power to the motor 10. The vapor emanating from the material 14 at the temperature $T_2$ is sensed by an ionization detector 20 which is positioned in proximity to the motor generator assembly and preferably adjacent to the motor 10. Ionization detectors are well known and the details of the detector 20 are therefore not illustrated. Ionization detector 20 is adapted to sense the existence of vapors emanating from the material 14. This represents the occurrence of a faulty condition and an output from the ionization detector which may comprise a voltage, a current or a variation in impedance is coupled to an amplifying means 22 which controls a power interrupt circuit 24. Operating power for the motor 10 is derived from an alternating current source 26 and is applied to the motor through the interrupt circuit 24. The interrupt circuit comprises relay coils or circuit breakers through which power is supplied to the motor and which provides for interruption of this coupling by the amplifier 22 upon sensing of the vapor by the ionization detector 20. Thus, the motor is prevented from self-destruction through overheating by the provision of a vaporizable material 14 which vaporizes at a temperature $T_2$ which is above the desired operating temperature $T_1$ of the motor and below a temperature $T_3$ at which serious damage to the motor could occur.

The vaporizable material 14 comprises a substance which provides vaporization at a desired temperature and which is compatible with the material to which it is applied. The material 14 may comprise any of various materials including varnish, paste, paint, cement, enamel, paper or other organic materials, a polymer or the like. This material is selected, to exhibit vapor or fume or aerosol generating characteristics at a desired temperature threshold. The coating material may be in the form of a liquid such as a varnish or a paint, in the form of a solid such as a resin, plastic, polymer, cement or in the form of a gas which is absorbed by the body to be coated and released upon an increase in temperature.

Figure 2A:
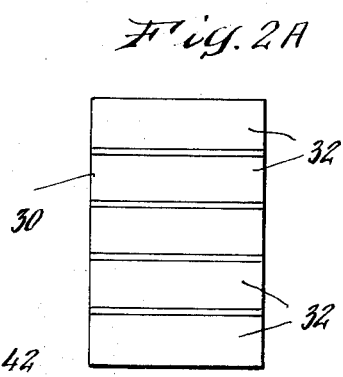
FIG. 2A is a front elevation of a large scale electronic apparatus having a detection system in accordance with this invention.
Figure 2B:
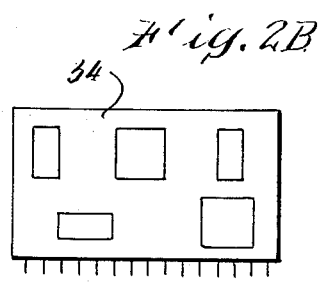
FIG. 2B is an enlarged view of a printed circuit board utilized with the apparatus of FIG. 2A.
Figure 2C:
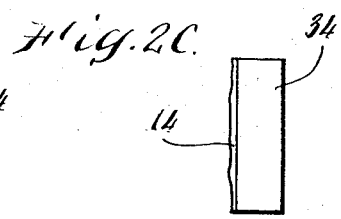
FIG. 2C is an enlarged side view of a portion of the circuit board of FIG. 2B and illustrating a vaporizable substance deposited thereon.

FIG. 2 illustrates an electronic apparatus which advantageously incorporates the detection system of this invention. The electronic apparatus comprises a cabinet 30 having a plurality of slidable drawers 32 which can be withdrawn from the cabinet to expose a large number of printed circuit boards 34 mounted in each drawer. A typical printed circuit board 34 is illustrated in FIG. 2B. There is mounted on the printed circuit board 34 a plurality of electronic components such as capacitors, inductors, and resistors. These elements are intercoupled on the printed circuit board by printed wiring not illustrated. In order to protect the electronic apparatus from overheating and self-destruction, the vaporizable material 14 is shown in FIG. 2C to be deposited upon the printed circuit board 34. The material 14 may alternatively be deposited upon the electronic components and more particularly on those components which perform an important operation in determining the characteristics of operation of the circuit. Thus, when a critical oscillator circuit is temperature sensitive and a component thereof begins to overheat as a result of a fault in the circuit itself or because of a defect of the circuits or in the cabinet of the apparatus, then the operation of the apparatus can be deleteriously affected. The vaporizable film 14 can then be desposited upon the elements of the oscillator circuit, for example, in order to sense when the components of this circuit depart from their operating temperatures and attain a temperature $T_2$ at which the operation of circuit becomes unreliable.

Figure 1B:
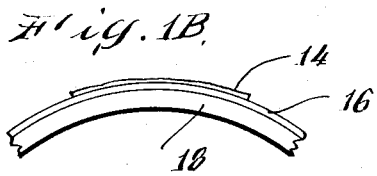
FIG. 1B is a cross section of a portion of a motor of FIG. 1A illustrating a vaporizable material deposited thereon.
Figure 3A:
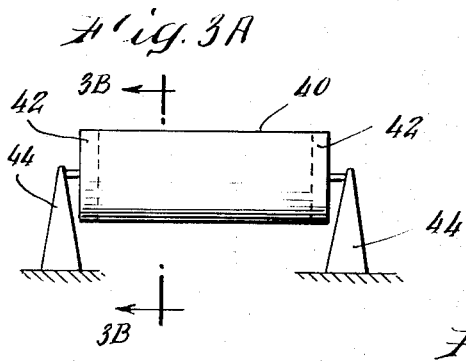
FIG. 3A is a side view of a support body in a vaporizable material deposited thereon.
Figure 3B:
FIG. 3B is a view taken along lines 3B—3B of FIG. 3A.

While there has been illustrated in FIGS. 1 and 2 arrangements wherein the vaporizable material may be deposited directly on the apparatus 10 or on a circuit board or component as illustrated with respect to FIG. 2, at times it is desirable to monitor environmental conditions in an area such as a storage area wherein there is no suitable body upon which to deposit the vaporizable material. In this case, the material is deposited upon a body 40 which as illustrated in FIG. 3A is shown to comprise a cylindrically shaped, thin walled, metallic body 40 which is mounted on thermally insulating support members 42 and suspended about an axis thereof on support body 44. The vaporizable material may be deposited about the outer surface of the drum shaped body 40 as illustrated in FIG. 3B. The body 40 may then be placed in those areas where it is desirable to monitor the atmospheric temperature for example.

Figure 4:
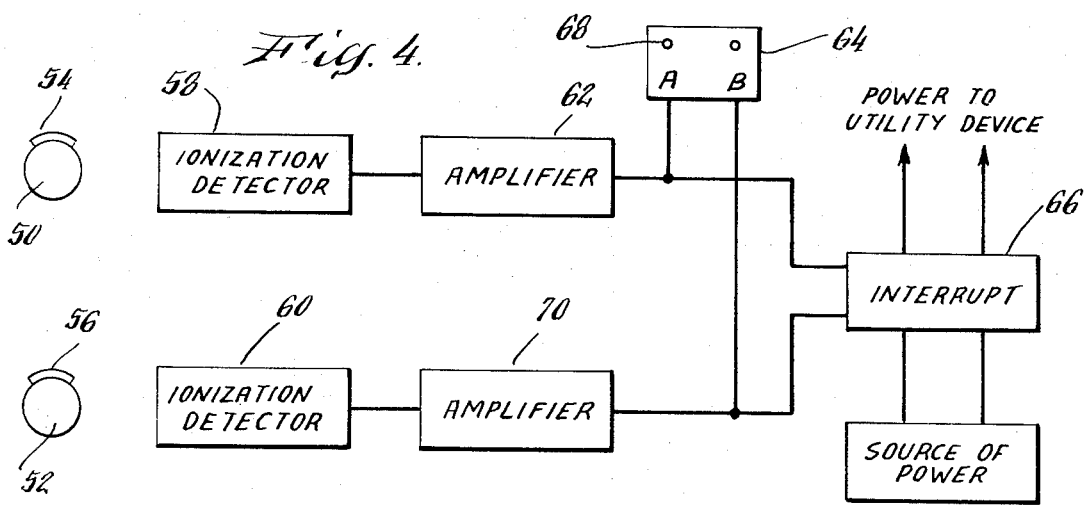
FIG. 4 is a schematic diagram in block form illustrating a detection system for detecting faults and discriminating between the source of the faults.

Two or more bodies or systems can be simultaneously monitored by depositing different vaporizable materials on the bodies and by providing ionization detectors which are adapted to sense the particular material. In FIG. 4 there is illustrated a detection arrangement for sensing when either of the bodies 50 or 52 attain an undesired elevated operating temperature $T_2$ and for detecting and indicating which of the bodies has attained this undesired condition. A film of vaporizable material 54 is deposited on an outer surface of the body 50 while a film of different vaporizable material 56 is deposited on an outer surface of the body 52. An ionization detector 58 is provided and is adapted for sensing the occurrence of a vapor from the material 54 while an ionization detector 60 is also provided and is adapted for sensing the occurrence of a different vapor from the material 56. An output from the ionization detector 58 is coupled, via an amplifier 62, to an indicator circuit 64 and to an interrupt circuit 66 for interrupting the application of power to the bodies 50 and 52. The indicator circuit 64 comprises a display board along with suitable triggered electronic storage elements such as flip-flop circuits which are triggered by a signal derived from the amplifier 62 and which energize and cause illumination of a lamp 68. Similarly, an output signal from the ion detector 60 is coupled via the amplifier 70 to the display panel 64 and to the interrupt circuit 66. While outputs from either the ionization detector 58 or 60 will cause interruption of power to both of the devices, it is apparent that power can be interrupted to one of the devices independent of the other device.

Upon detection of a fault, the ionization detector alternative to decoupling power from the device can provide an audible alarm or a visual alarm as indicated in FIG. 4. The ionization detecting device may also be remotely located and include a transmitting means for transmitting to a receiving station. An arrangement of this type is described and claimed in my co-pending U. S. patent application Ser. No. 221,235, filed Jan. 27, 1972, and entitled ALARM SYSTEM.

An improved method and apparatus for the ionization detection has thus been described. While the system has been described with particular attention to faulty conditions, it will be apparent that the technique employed can also be utilized in processes for effecting control. The described invention is particularly advantageous in that partial damage or destruction of the apparatus is avoided while at the same time selective monitoring and detection is effected for distinguishing and localizing a faulty condition. The system is operable for detecting fumes, gases and aerosols which are emitted upon the establishment of the predetermined condition.

While there have been described particular embodiments of the invention, it will be apparent that various modifications may be made therein without departing from the spirit of the invention and the scope of the appended claims.

What is claimed is:

1. An improved detection arrangement for sensing an elevation in temperature of a body from a temperature $T_1$ to a relatively higher temperature $T_2$ and for generating an indication of the elevation in temperature to the temperature $T_2$ comprising:

a support body whose temperature is subject to rise;

a material positioned on said support body in close contact with said body whereby the temperature of said material will vary substantially in accordance with variations in the temperature of said body, said material being independent of the structure of said body and adapted to emit into the atmosphere above the body at a predetermined elevated temperature $T_2$ a gaseous phase substance whose existence can be detected by ionization detection means;

ionization detection means positioned near said support body for detecting an emission into the atmosphere about the body from said material;

means responsive to said ionization detector for providing an indication of the detection of said substance, said support body comprising a member of an energized apparatus, a source of energy, means for applying energy from said source to said apparatus, said means for applying energy adapted to be responsive to the electrical indication of said ionization detector for automatically interrupting the application of energy to said apparatus upon an occurrence of said indication.

2. The apparatus of claim 1 wherein said apparatus comprises an electrically energized apparatus, said source of energy comprises a source of electrical energy and said means for applying electrical energy to said apparatus comprises electrically responsive means which are responsive to said indication for interrupting the application for energy to said apparatus.

3. The apparatus of claim 1 including a second support body, a second material deposited on said second support body and adapted for emitting a gaseous phase substance at a predetermined temperature, a second ionization detection means for detecting and providing an electrical indication of the occurrence of an emission from said second material and means responsive to said electrical indication from said second ionization detector providing an indication of the emission from said material.

* * * * *